United States Patent [19]

Debeneix et al.

[11] Patent Number: 4,638,631
[45] Date of Patent: Jan. 27, 1987

[54] MULTIFLOW TURBO JET ENGINE SECONDARY FLOW ADJUSTING DEVICE

[75] Inventors: Pierre Debeneix, Saint Sauveur sur Ecole; Marcel J. Tournere, Paris, both of France

[73] Assignee: Societe Nationale d'Etude et de Construction de Moteurs d'Aviation "S.N.E.C.M.A.", Paris, France

[21] Appl. No.: 637,834

[22] Filed: Aug. 6, 1984

[30] Foreign Application Priority Data

Aug. 18, 1983 [FR] France .................... 83 13418

[51] Int. Cl.$^4$ ............................................. F02K 3/02
[52] U.S. Cl. ................................. 60/226.3; 60/262
[58] Field of Search ............ 60/226.3, 261, 262, 60/263, 226.2; 415/150

[56] References Cited

U.S. PATENT DOCUMENTS

| | | |
|---|---|---|
| 3,118,276 | 1/1964 | Keenan et al. |
| 3,280,561 | 10/1966 | Kutney ........................ 60/226.2 |
| 3,296,800 | 1/1967 | Keenan et al. ............... 60/262 X |
| 3,344,606 | 10/1967 | Abernethy ................... 60/39.29 |
| 3,432,100 | 3/1969 | Hardy et al. |
| 3,662,556 | 5/1972 | Poucher et al. ............. 60/39.29 X |
| 3,769,797 | 11/1973 | Stevens . |
| 3,974,646 | 8/1976 | Markowski et al. .......... 60/261 X |
| 4,086,761 | 5/1978 | Schaut et al. ............... 60/262 X |
| 4,145,877 | 3/1979 | Montgomery ............... 60/226.2 |

FOREIGN PATENT DOCUMENTS

| | | |
|---|---|---|
| 2917303 | 10/1980 | Fed. Rep. of Germany . |
| 1291561 | 3/1962 | France . |
| 1330633 | 5/1963 | France . |
| 1377199 | 9/1964 | France . |
| 2316443 | 1/1977 | France . |

*Primary Examiner*—Carlton R. Croyle
*Assistant Examiner*—Donald E. Stout
*Attorney, Agent, or Firm*—Oblon, Fisher, Spivak, McClelland, & Maier

[57] ABSTRACT

A multiflow turbojet engine secondary flow adjusting device which includes annular vanes regularly distributed around the secondary duct. The vanes are movable about two fixed axes disposed between one half and one third of the height of the duct when the vane is in the active position. A control mechanism for the vanes are disposed within the interior of the duct and act on the axis of radial symmetry and at two-thirds of the height of the duct when the vane is in the active position. In the inactive position, the vane is parallel to the secondary air flow. The actuator and the fixed support axes form a modular assembly in accordance with another embodiment.

9 Claims, 7 Drawing Figures

FIG.: 5

MULTIFLOW TURBO JET ENGINE SECONDARY FLOW ADJUSTING DEVICE

BACKGROUND OF THE INVENTION

1. Field of the Invention

This invention relates to a multiflow turbojet engine secondary flow regulating device.

2. Summary of the Prior Art

In multiflow turbojet engines with a re-heating duct, the secondary flow of cold air must be controllable in order to provide satisfactory operation of the re-heat over a large range of sub-sonic or supersonic conditions of flight. The relative speed of the secondary flow must be controlled at its junction with the primary flow so that the degree of dilution will be optimized. Such control can be effected by regulating the secondary flow.

French Patent Specification No. 2 316 443 describes a device for varying the degree of dilution constituted by a diaphragm placed in the secondary duct and capable of regulating secondary flow by a reduction in the free section of the duct. The device comprises a number of consecutive peripheral vanes. Each of these vanes occupies a segment of the circumference and is movable in a radial plane of the engine. The vanes are pivoted at their ends on two fixed pivots parallel to the axis of the engine. The other end is actuated radially by the piston rod of an actuator. The actuator acts at the adjacent ends of two consecutive vanes whilst the other ends of the vanes engage against one of the ends of the others of the consecutive vanes. The variation in the section of the duct results in the formation of a star shaped configuration by projection into the duct of the ends controlled by the actuators.

In the inactive position, the device reduces the section of the flow passage and thus requires overdimensioning of the diameter of the secondary casing; moveover, the actuators, being disposed on the outer casing, increase the overall cross-section of the engine as a whole.

U.S. Pat. No. 3,344,606 describes a device for bleeding air at one stage of the compressor in order to supply the re-heating duct. The casing of the compressor concerned comprises openings delivering into an annular collector connected by passages to another collector surrounding the re-heat chamber. Each opening is provided with a vane which pivots at one of its ends about an axis tangential to the casing, and is disposed in a radial plane. The opening or the closure of the vanes is controlled by an actuator acting on an annulus capable of being displaced axially on inclined planes of the vanes.

The turbo jet engine described is not of the multiflow type and does not include a secondary annular duct surrounding the primary duct. Thus, neither the problem of a reduction in the free section of the duct when the device is inactive, nor an increase in the overall cross-section of the engine arises.

The bleeding of air from the compressor does not pose the same aerodynamic problems as the modification of the discharge into the permanent flow of air in an annular duct.

SUMMARY OF THE INVENTION

According to the present invention there is provided a secondary flow regulating device for incorporation in a multiflow turbojet engine, including part-annular vanes arranged to be regularly distributed in the annular secondary duct, each vane being movable about two circumferentially-spaced fixed axes, the two axes of any one vane being a continuation one of the other so that at the centre of each vane the common axis is tangential to an imaginary circle within the secondary annular duct, and control means of each vane are disposed within the secondary duct operative to pivot the vane about the pivot axes thereof, the control means being arranged to be disposed downstream of the vane with respect to the direction of flow of the secondary air and being arranged to be directly or indirectly secured to a wall of the secondary duct and to a part of the vane.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein

FIG. 5 is a fragmentary view in the direction of arrow V of FIG. 4;

DESCRIPTION OF THE PREFERRED EMBODIMENT

Referring now to the drawings, fragmentary views are shown of a turbojet multi-flow engine having a primary duct 1 and a secondary duct 2. The primary duct 1 is disposed in the lower part of each Figure and is separated from the secondary duct by a wall 3 of which the outer surface constitutes at least partially the inner wall of the secondary duct 2. The secondary duct is outwardly defined by an outer wall 4. As is known and currently in practice, the inner and outer walls are formed by cylindrical or cylindrical/conical casings secured axially to one another by flanges 5,6 which are integral with the ends of the sections.

A secondary flow regulating device comprises a plurality of partly-annular vanes 7, uniformally distributed in an annular array within the secondary annular duct 2. Each vane 7 is movable about fixed pins 8,9, disposed at the radially inner or radially outer half of the vane. The pins 8,9 of each vane are approximately tangential to an imaginary circle within the secondary annular duct 2. The pins 8,9 are, in fact, aligned and can be considered as a single, common pivot axis. At a location half way between the ends of each vane (considered circumferentially) this common axis is tangential to the imaginary circle. The radial height of each vane is such that in an active position, that is to say when the surface of each vane lies, with respect to the direction of flow of secondary air, at a non-negligible angle; circumferential edges 12,13 lie adjacent to or are in contact with the inner wall 3 and outer wall 4 of the secondary duct. The pins 8,9 are, of course, only fixed in relation to the secondary duct assembly and may be rotatable.

The movement from the active position to the inactive position or vice versa is effected by control means 14, for example an actuator. These control means are disposed within the duct 2 between the vane and walls 3 or 4 of the duct, preferably downstream of the vane with respect to the direction of secondary flow. The free end 15 of the movable part of the actuator pivots on the vane through the intermediary of a pin 16 parallel to the axis defined by the fixed pins 8,9. The point of application of the force exerted by the actuator lies approximately on the axis of radial symmetry at an equal distance from the radially-extending edges of the vane and in the radially outer or inner half of the vane, the half selected being opposite to that carrying the pins 8,9.

Figure 1:
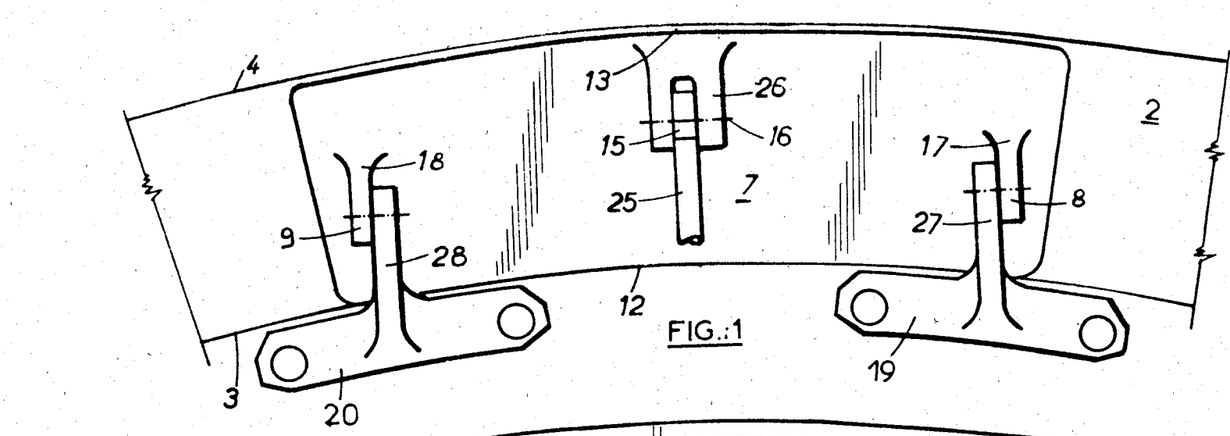
FIG. 1 is a fragmentary view on a radial plane of a turbojet engine of one embodiment of a device according to the invention.
Figure 2:
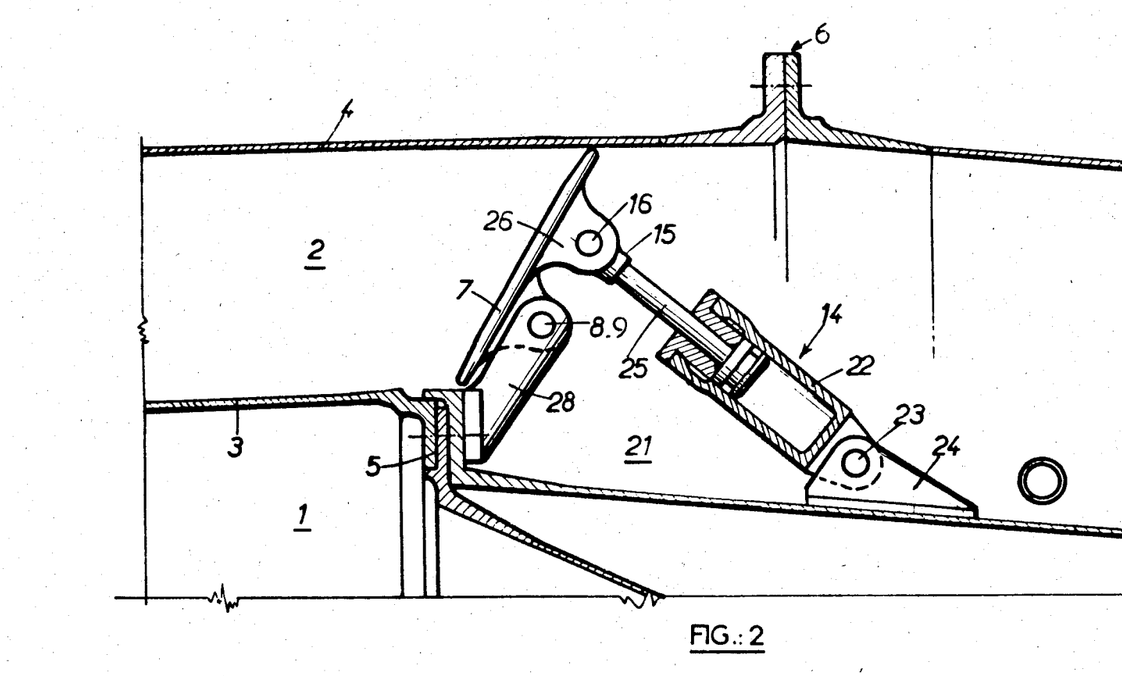
FIG. 2 is a fragmentary view in an axial plane of the device of FIG. 1.

According to a first embodiment illustrated in FIGS. 1 and 2, each vane 7 carries two lugs 17,18 each having a bore cooperating with the pins 8 and 9 which are furthermore, retained in the bores provided in two brackets 19,20 provided with substantially radial tabs 27,28 secured to a radial annular flange 5 interconnecting the walls 3 of two sections of the casing. The downstream section, being of smaller diameter in relation to the upstream section, defines an annular recess 21. The zone of the duct disposed at right angles to the flange 5 is termed the "throat of the flow". This "throat" can be considered as a step or restriction in the duct. According to the embodiment illustrated in FIGS. 1 and 2, the pivot axes lie at the radially inner half of the vane. The control means 14 is constituted by a pressure-fluid actuator, or a mechanical actuator. The body 22 of a pneumatic actuator is pivoted, by a pin 23, in a mounting clevis 24 secured to the inner wall 3 of the duct. The movable piston rod 25 of the actuator is pivoted to the vane 7 by the pin 16 engaged in bearings of a clevis 26 rigid with the vane, the clevis 26 being placed on the axis of radial symmetry and in the radially outer half of the vane 7.

FIG. 2 illustrates the vane in the active position, that is to say the actuator piston rod is extended and the circumferential edges of the vane are substantially in contact with the walls of the duct. The radially inner edge of the vane is, in accordance with that embodiment, substantially at right angles to the "throat of the flow". The radial tabs 27,28 of the brackets carrying the pins make, with respect to a radial plane passing through the flange 5, an angle which is not negligible and defines an inclined orientation to the surface of the vane with respect to the secondary air flow, which ensures reduction in turbulence during the displacement of the vanes towards their inactive position.

In the inactive position, the piston rod of the actuator is retracted and the surface of each vane lies parallel to the direction of flow. The vane thus causes a minimum obstruction in the duct, the more so since the actuator and the means mounting it on the wall are at least partially recessed into the annular cavity 21. The disturbing action in the inactive configuration of the vanes on the secondary air flow is negligible.

The operation of the actuators occurs simultaneously by the interconnection through pressurized control fluid distribution manifold.

Figure 3:
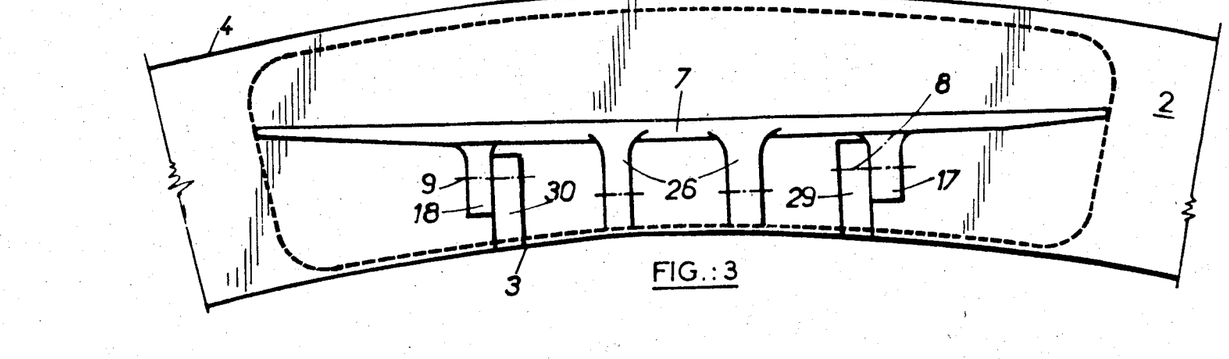
FIG. 3 is a fragmentary view in a radial plane of a second embodiment of the device in accordance with the invention.
Figure 4:
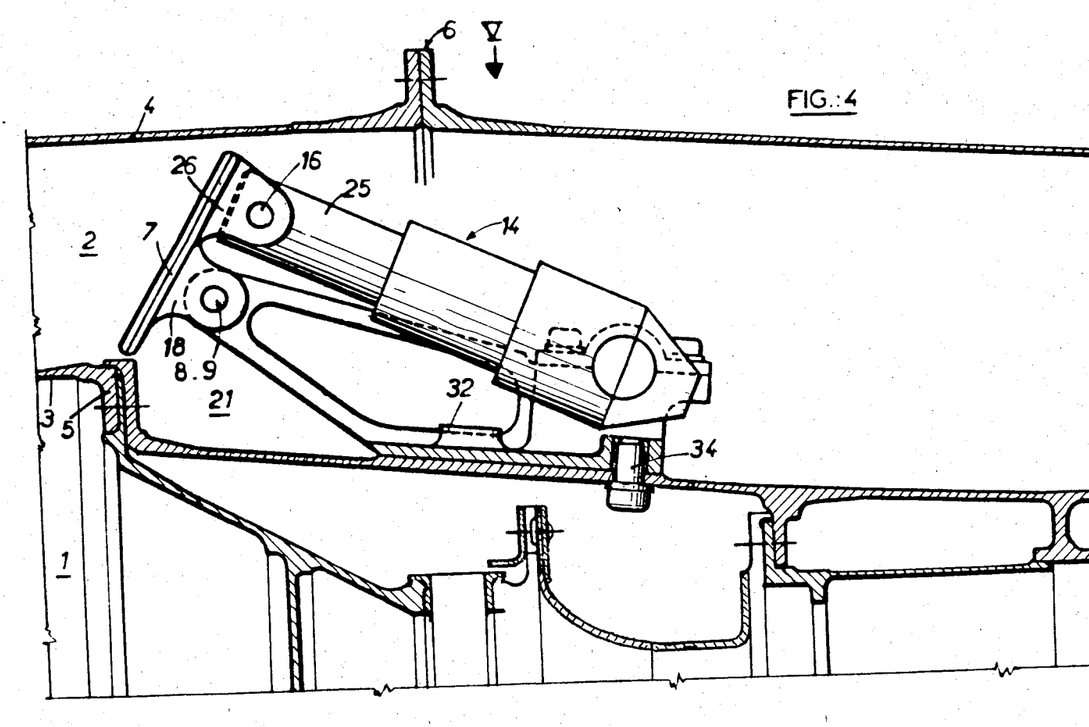
FIG. 4 is a fragmentary view in an axial plane of the device according to FIG. 3.

FIGS. 3, 4, 5 illustrate a second embodiment in which the assembly of fittings and brackets for the pins secured in the securing clevises of the actuator have been made in one piece so as to form modular assemblies. The securing of such assemblies is simplified and facilitates maintenance.

The pins 8 and 9 enabling rotation of the vane cooperate with lugs 17,18 of each vane and with bores provided in the upsteam ends (in relation to the direction of flow of the air) of the webs 29,30 of a support bracket 31 of shape. Bosses 32,33,34 each provided with a tapped bore are formed in the base plate of the bracket 31 and serve to secure the vane and actuator assembly on the secondary duct inner wall, with the aid of bolts.

The mounting clevis of the actuator is formed by the downstream ends of the webs which carry two bearings 35,36 in which the pin 23 can pivot and the pin is secured to the body of the actuator 14. The end of the actuator piston rod cooperates with the pin 16 supported in the clevis 26 rigid with the vane. The fixed pins 8,9 on the one hand and the pin 16 on the other hand are disposed respectively within the radially inner halves and radially outer halves of the vane.

In this embodiment the actuator is a screw actuator and is controlled by a flexible member, not shown. The various actuators are interconnected by flexible members driven by a motor (not shown).

In the inactive position (FIG. 3), each vane 7 has its surface substantially parallel to the direction of air flow and constitute a negligible obstruction to that flow. In the active position (FIG. 4), one vane is illustrated after pivoting about the pins 8,9 and the surface is disposed in the flow in a position perpendicular thereto or, preferably, so inclined that the vane blocks almost totally the space defined by the walls 3 and 4.

According to one embodiment of the device in accordance with the invention, the total of the lengths of the vanes in the peripheral sense corresponds approximately to one half of the circumferential length of the secondary duct. In the arrangements described in connection with FIGS. 1 and 2 on the one hand, and in connection with FIGS. 3,4,5 on the other hand, it is to be noted that the fixed pins 8,9 are disposed approximately between one half and one third of the distance from the radially inner edge to the radially outer edge of the vane 7. This arrangement provides at least a partial compensation for the aerodynamic torque exerted on the vanes and enables the use of lower rated power actuators. Preferably, the fixed pins 8,9 are in practice as close as possible to the centre of the vane in order to reduce the torque, but should be towards the radially inner-edge of the vane so that in the case of breakage or other failure of one of the control elements, the vane automatically retracts to the retracted position rather than to the obstructing position.

Figure 6:
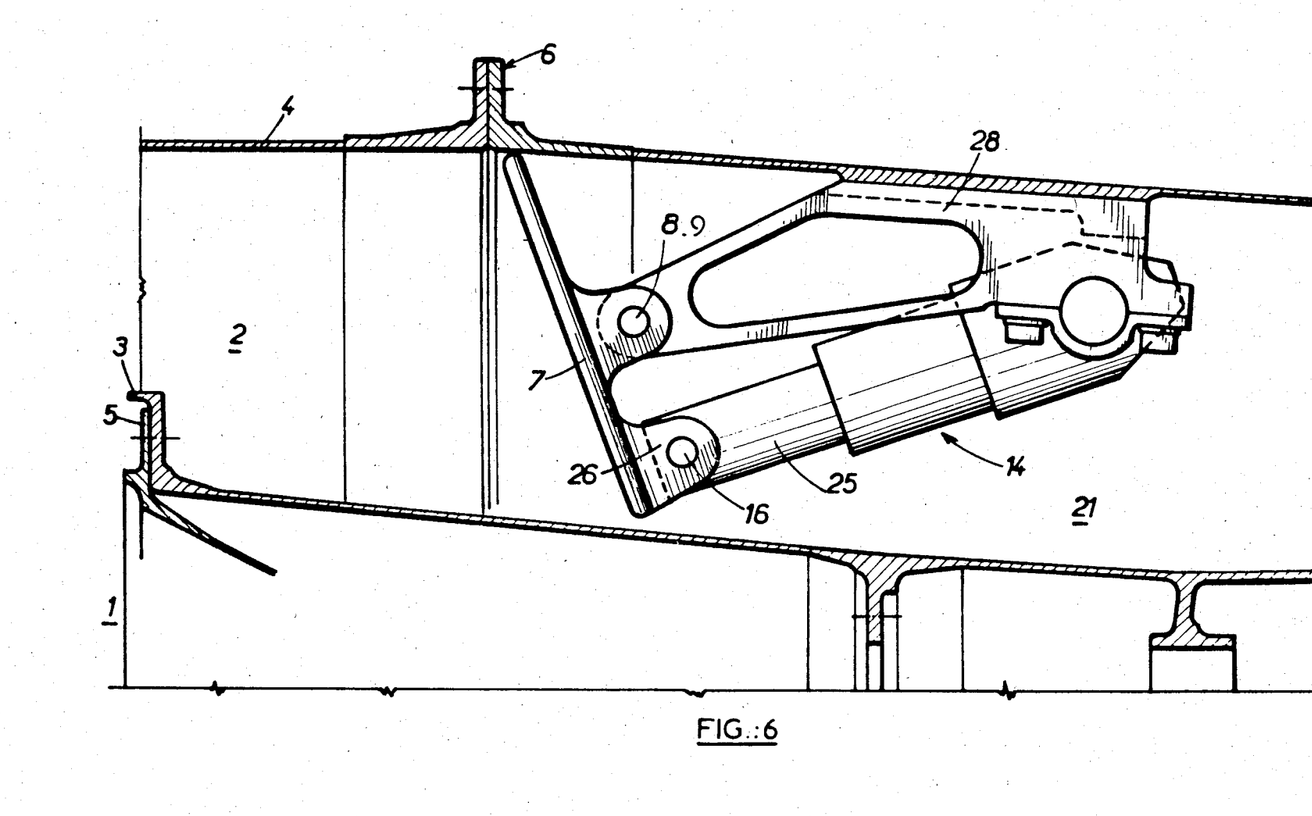
FIG. 6 is a fragmentary view in an axial plane of a similar device to that of the preceding embodiment but which is located in a different zone of the annular secondary duct.
Figure 7:
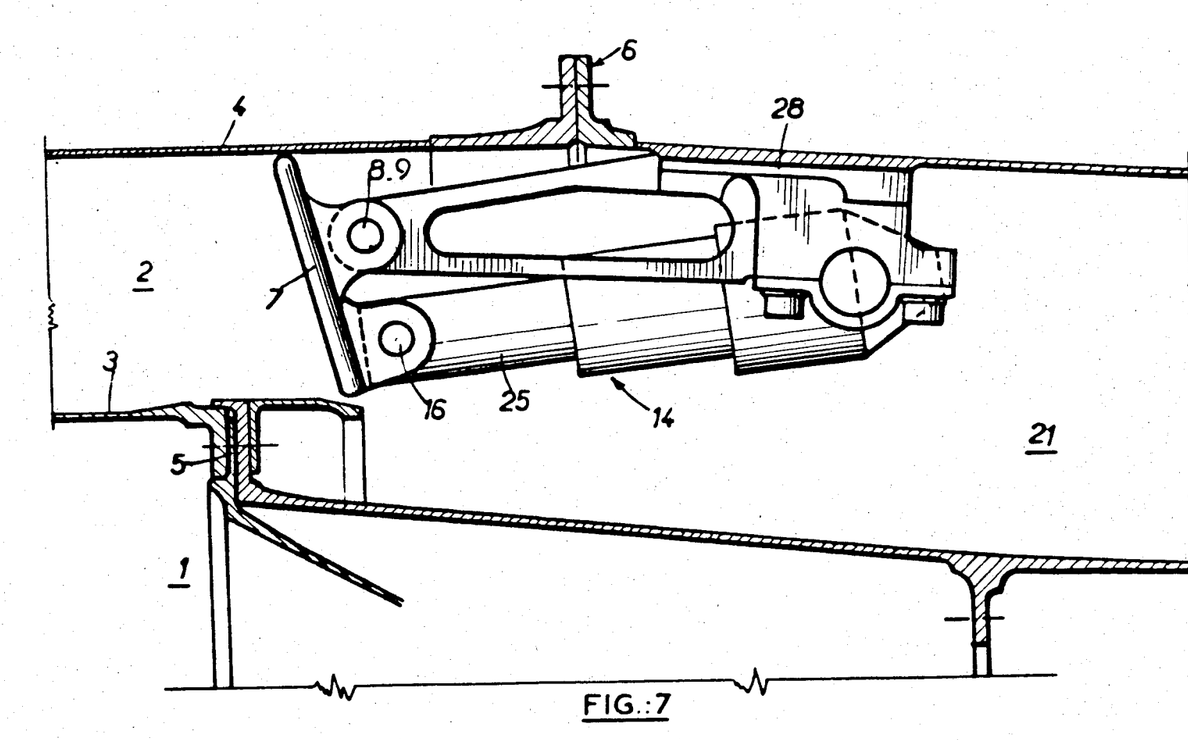
FIG. 7 is a fragmentary view in an axial plane of a device similar to that of the second embodiment but which is located in another zone of the annular duct.

FIGS. 6 and 7 show embodiments of the actuator/vane assemblies similar to those described in relation to FIGS. 3, 4 and 5, the essential difference residing in the position that they occupy in the secondary duct. Contrary to FIGS. 1 to 5, the assemblies of vanes and actuators are now secured on the outer wall 4 of the duct and are located in FIG. 6 downstream of the flange 5 and associated parts defining the throat of the secondary flow, and in FIG. 7 at the throat itself.

According to a preferred embodiment of the invention, the pins 8,9 of the vanes are disposed between one half and one third of the distance from the edge of the vane remote from the pivotal connecting point of the actuator and the edge of the vane closer to the pivotal connecting point of the actuator, in order to reduce the force required to be exerted by the actuators. This arrangement ensures, for this embodiment, a compensation which is at least partial (as all the embodiments of FIGS. 1 to 5) for the aerodynamic force applied to the vanes and enabling the use of actuators with dimensions which are smaller and use less power.

The principle advantages of devices as hereinbefore particularly described are:
(i) a total or partial retraction of the vanes from the secondary flow which leaves a maximum section for the secondary flow;
(ii) a mounting arrangement which leaves the external space of the engine free of obstructions and thus reduces the overall cross-section of the engine; and
(iii) a modular compact form constituted by each vane and the control means facilitating access and maintenance.

Obviously, numerous modifications and variations of the present invention are possible in light of the above teachings. It is therefore to be understood that within the scope of the appended claims, the invention may be practiced otherwise than as specifically described herein.

We claim:

1. In a multiflow turbojet engine having an annular secondary duct defined by inner and outer annular walls,
a secondary flow regulating device for varying the passage section of said annular secondary duct including:
partly-annular vanes regularly distributed within the annular secondary duct of the engine,
each vane being movable about two circumferentially-spaced fixed pins,
the axis of two pins of any one vane being a continuation one of the other so that at the center of each vane of the common axis is tangential to an imaginary circle within the annular secondary duct, and
means located downstream of said vane for operatively controlling each vane for pivoting the vane about the pivot pins thereof,
the control means being disposed downstream of the vane with respect to the direction of flow of the secondary air and being secured to one of said walls of the annular secondary duct and to a part of the vane wherein each vane has an axis of radial symmetry and two lugs provided with bores, said pins are engaged in the bores, and wherein brackets are mounted on said inner wall of the annular secondary duct, said brackets having bores within which said pins are disposed and a clevis arranged on said axis or radial symmetry of each said vane and in an opposite half in a radial sense to a half having the lugs, the clevis being connected with the control means.

2. An engine according to claim 1, wherein the control means further comprise a movable part having a first pin connected with said clevis and a second part having a second pin, and a mounting clevis receiving the second pin and secured to said wall of the annular secondary duct.

3. An engine according to claim 3, wherein the brackets of the fixed pins and the mounting clevis comprise a unitary mounting assembly of shape comprising two webs, the mounting assembly carrying at its ends bearings and having bores for the fixed pins and for the pin of the said one part of the control means and a base plate by which the mounting assembly can be secured to said wall of the annular secondary duct.

4. An engine according to claim 1, wherein the annular secondary duct has a flow restriction, the vanes, in the active position, each having one corresponding edge immediately adjacent to the restriction.

5. An engine according to claim 1, wherein the annular secondary duct has a flow restriction, and the vanes, in the active position, lie downstream of the flow restriction.

6. An engine according to claim 1, wherein the fixed pins of each vane are disposed between one half and one third of the radial distance across the annular secondary duct, when the vane is in its active position, from the radially inner part of the flow regulating device when the latter is mounted on said inner annular wall of the annular secondary duct.

7. An engine according to claim 1, wherein the fixed axes of each vane are located at a position between one half and one third of the radial distance across the secondary duct, when the vane is in its active position, from the outside when the flow regulating device is mounted on the said outer wall of the secondary duct.

8. An engine according to claim 6, wherein the pivot pin of the control means at each vane lies approximately two-thirds across the radial dimension of the annular secondary duct when the vane is in its active position, measured from the inside of the duct when the device is mounted on the said inner wall of the annular secondary duct.

9. An engine according to claim 6, wherein the pivot pin of the control means at the vane is about two-thirds across the radial dimension of the secondary duct when the vane is in its active position, measured from the outside of the duct when the device is mounted on the said outer wall of the secondary duct.

* * * * *

UNITED STATES PATENT AND TRADEMARK OFFICE
CERTIFICATE OF CORRECTION

PATENT NO. : 4,638,631

DATED : JANUARY 27, 1987

INVENTOR(S) : PIERRE DEBENEIX and MARCEL J. TOURNERE

It is certified that error appears in the above-identified patent and that said Letters Patent is hereby corrected as shown below:

In title, delete "TURBO JET" and insert --TURBOJET--;

In column 1, line 13, delete "sub-sonic" and insert --subsonic--;

In column 1, line 53, delete "turbo jet" and insert --turbojet--;

In column 2, line 20, delete "wherein" and insert --wherein:--;

In column 2, line 45, delete "multi-flow" and insert --multiflow--;

In column 2, line 57, delete "uniformally" and insert --uniformly--;

UNITED STATES PATENT AND TRADEMARK OFFICE
CERTIFICATE OF CORRECTION

PATENT NO. : 4,638,631
DATED : JANUARY 27, 1987
INVENTOR(S) : PIERRE DEBENEIX and MARCEL J. TOURNERE It is certified that error appears in the above-identified patent and that said Letters Patent is hereby corrected as shown below:

In column 2, line 64, delete "half way" and insert --halfway--;

In column 4, line 11, after "of" insert --a predetermined--;

In column 4, line 30, delete "constitute" and insert --constitutes--;

In column 6, line 12, delete "comprise" and insert --further comprise--;

In column 6, line 13, delete "of shape" and insert --of a shape--;

In column 6, line 11, delete "claim 3" and insert --claim 2--;

UNITED STATES PATENT AND TRADEMARK OFFICE
CERTIFICATE OF CORRECTION

PATENT NO. : 4,638,631

DATED : JANUARY 27, 1987

INVENTOR(S) : PIERRE DEBENEIX and MARCEL J. TOURNERE

It is certified that error appears in the above-identified patent and that said Letters Patent is hereby corrected as shown below:

In column 6, lines 36-37, delete "the secondary" and insert --the annular secondary--;

In column 6, line 39, delete "the secondary" and insert --the annular secondary--;

In column 6, line 49, delete "the secondary" and insert --the annular secondary--;

In column 6, line 52, delete "the secondary" and insert --the annular secondary--.

Signed and Sealed this

Twenty-ninth Day of December, 1987

*Attest:*

DONALD J. QUIGG

*Attesting Officer*  *Commissioner of Patents and Trademarks*